June 14, 1960  R. C. SMITH  2,940,473
ROTARY COOLANT VALVE
Filed Sept. 14, 1955  2 Sheets-Sheet 1

Robert C. Smith
INVENTOR.

BY *Clarence A. O'Brien*
*and Harvey B. Jacobson*
Attorneys

June 14, 1960 R. C. SMITH 2,940,473
ROTARY COOLANT VALVE
Filed Sept. 14, 1955 2 Sheets-Sheet 2

Robert C. Smith
INVENTOR.

BY
Attorneys

United States Patent Office 2,940,473
Patented June 14, 1960

2,940,473

ROTARY COOLANT VALVE

Robert C. Smith, Richmond, Mich.
(27684 Moran, Mount Clemens, Mich.)

Filed Sept. 14, 1955, Ser. No. 534,197

2 Claims. (Cl. 137—609)

This invention relates to new and useful improvements in valves, and more specifically to a rotary coolant valve intended to be utilized in combination with turrets and machine tools.

A screw-threading machine or a turret lathe is provided with a turret carrying a plurality of tools. As each operation is performed, the turret is rotated so that the tool may be brought into its proper position by operation on a workpiece. Inasmuch as the various tools carried by a turret are of a different nature, it is necessary that the amount of coolant be varied as the tools are brought into position. In the average turret machine tool assembly there is provided a single coolant line having a valve for adjusting the flow. This necessitates not only the positioning of the turret, but also the manually setting of the valve so as to control the flow of coolant to the tool which is brought to bear against the workpiece.

It is therefore the primary object of this invention to provide an improved rotary coolant valve which is so constructed whereby it may be operated in unison with the positioning of the turret with which it is associated in order that the supply of coolant to the various tools may automatically be controlled by the operation of the turret.

Another object of this invention is to provide a rotary coolant valve which is of such construction whereby it may be mounted on top of existing turrets and which may be rotated with such turrets for supplying coolant at various degrees to the various tools in response to the positioning of such tools with respect to a workpiece.

Still another object of this invention is to provide an improved rotary coolant valve which is so constructed whereby it may be mounted on a turret for applying coolant to the various tools thereof, the rotary coolant valve being so constructed whereby the coolant may be selectively distributed to tools either externally or internally thereof, or both, as deemed necessary.

A further object of this invention is to provide an improved rotary coolant valve which is so constructed whereby coolant is supplied to tools only when the tools are brought to bear with respect to a workpiece, the rotary coolant valve having a plurality of individual flow control valves whereby the amount of coolant supplied to individual tools may be preset.

These, together with other objects and advantages which will become subsequently apparent, reside in the details of construction and operation as more fully hereinafter described an claimed, reference being had to the accompanying drawings forming a part hereof, wherein like numerals refer to like parts throughout, and in which:

Figure 3:
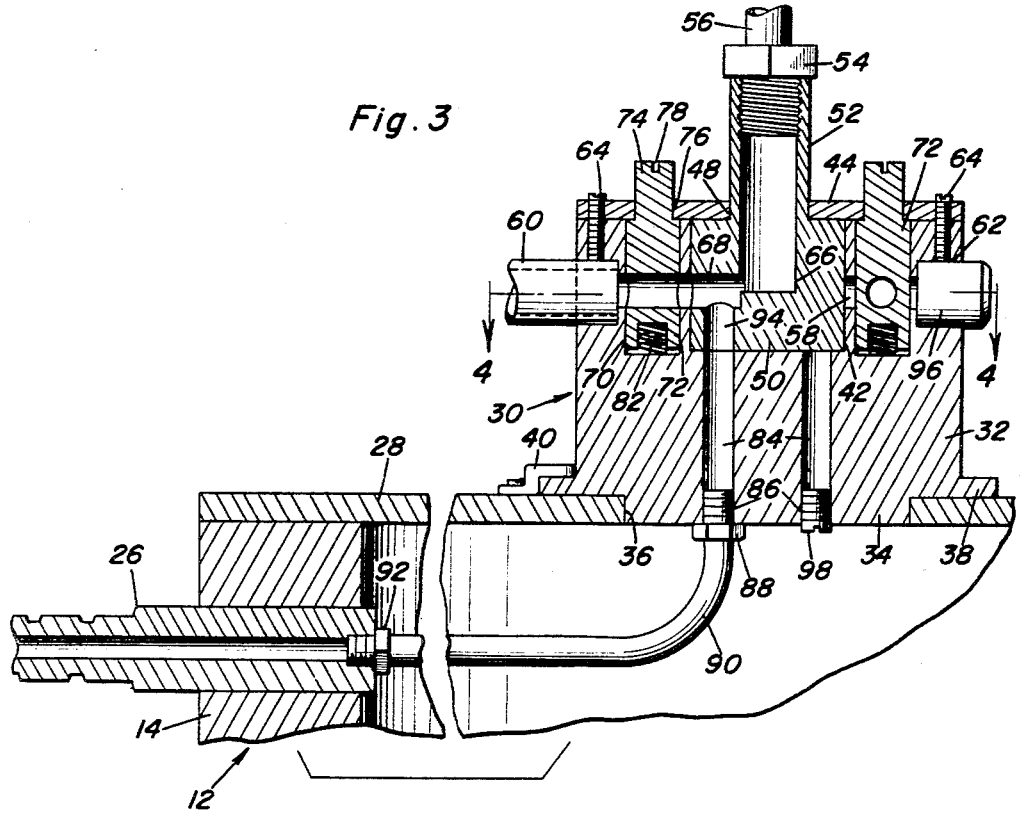
Figure 4:
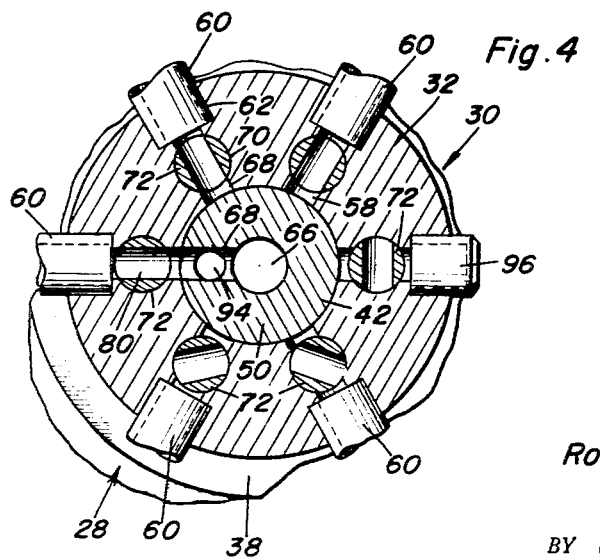

Figure 3 is an enlarged fragmentary vertical sectional view taken through a portion of the turret and the cooling valve and shows the arrangement of the various valve elements and valve member in the valve housing of the rotary coolant valve and the relationship of the various coolant passages therein, also, there is illustrated a connection between the rotary coolant valve and a hollow tool; and Figure 4 is an enlarged horizontal sectional view taken substantially upon the plane indicated by the section line 4—4 of Figure 3 and shows the arrangement of the various radiating coolant passages for supplying coolant to exterior of tools, also being clearly illustrated are the various settings of the valve elements for controlling the feeding of coolant to the various tools.

Figure 1:
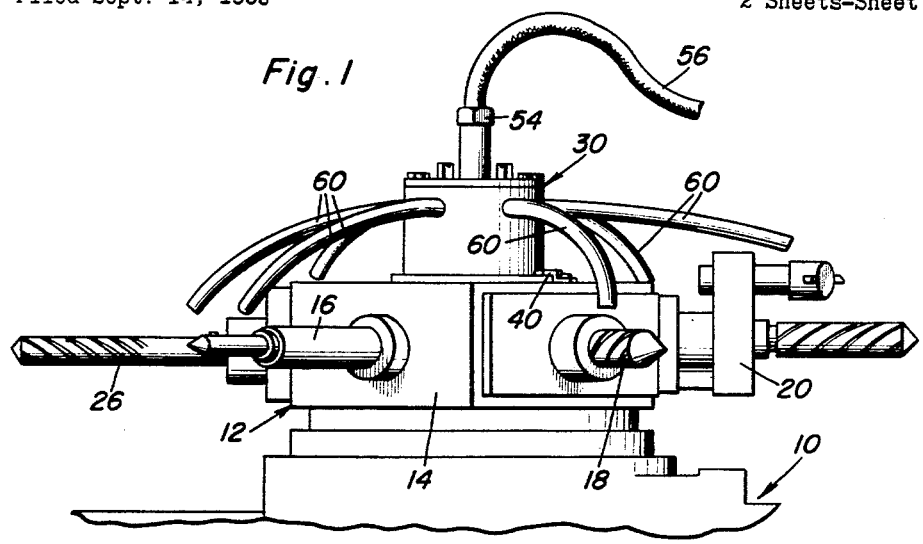
Figure 1 is a side elevational view of a conventional machine turret and shows mounted thereon the rotary coolant valve which is the subject of this invention, extending fromt the valve being a plurality of feed tools for supplying coolant to the various tools of the turret.

Referring now to the drawings in detail, it will be seen that there is illustrated in Figure 1 a tool holder which is referred to in general by the reference numeral 10, the tool holder 10 being a part of a conventional machine tool which may be a screw machine, a turret lathe, etc. Rotatably carried by the tool holder 10 is a conventional type of turret which is referred to in general by the reference numeral 12. The particular turret 12 illustrated is a hexagonal turret and has extending from the various side walls 14 thereof a plurality of individual tools 16, 18, 20, 22, 24 and 26, the various tools being those required for a predetermined job. The turret 12 is hollow, as is best illustrated in Figure 3 and is provided with a cover plate 28. It is to be understood that these aforementioned parts are conventional and need not be described in more detail here.

Mounted on the cover 28 of the turret 12 is the rotary coolant valve which is the subject of this invention, the rotary coolant valve being referred to in general by the reference numeral 30. The rotary coolant valve 30 includes a circular cross-sectional valve housing 32 which includes a reduced lower end portion 34 receivable in a recess or opening 36 formed in the central part of the cover 28. Disposed immediately above the reduced portion 34 is an outwardly projecting annular flange 38 which seats on the upper surface of the cover 28 and which is engaged by a plurality of Z-shaped clamps 40 to hold the valve housing 32 in place.

Figure 2:
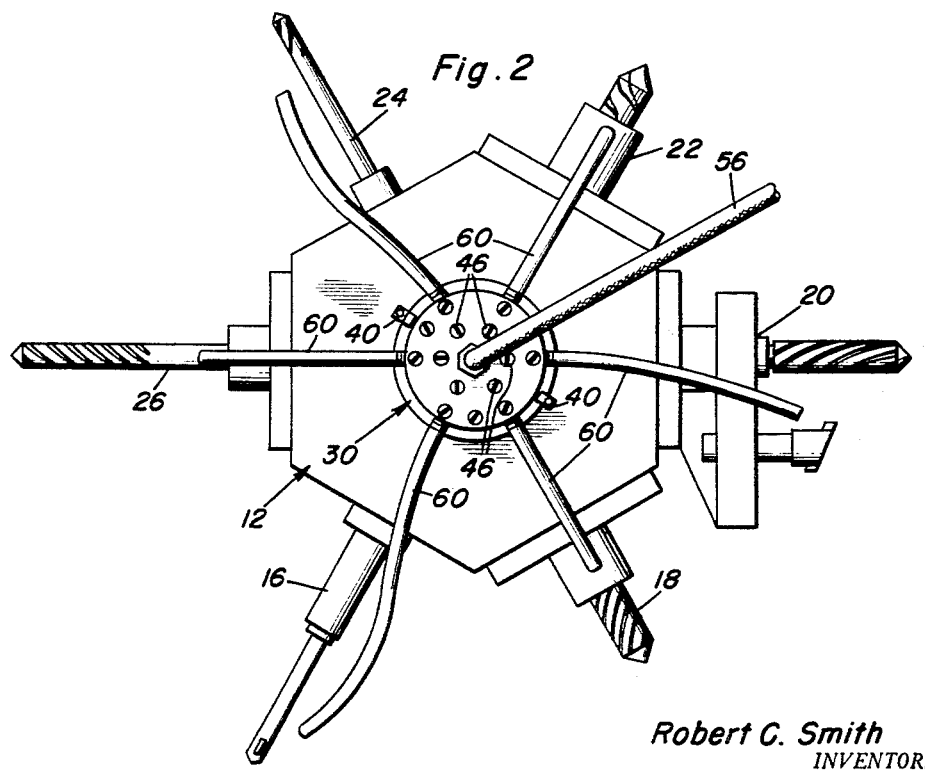
Figure 2 is a top plan view of the turret and coolant valve of Figure 1 and shows the arrangement of the various parts thereof, the machine on which the turret is mounted being omitted for purposes of clarity.

As is best illustrated in Figure 3, the valve housing 32 is provided in the upper central portion thereof with a circular cross-sectional recess 42. The recess 42 is partially covered by an annular cover plate 44 having an exterior diameter equal to that of the valve housing 32. The cover plate 44 is removably retained in place by a plurality of fasteners 46 which are best illustrated in Figure 2. The cover plate 44 is provided with a centrally located opening 48 which is disposed coaxial with the recess 42.

Seated in the recess 42 is a valve member 50. The valve member 50 includes a tubular neck portion 52 which extends upwardly through the opening 48 and above the cover plate 44. Suitably secured to the neck portion 52 by a fitting 54 is a coolant supply pipe hose 56.

Referring now to Figures 3 and 4 in particular, it will be seen that there is formed in the upper part of the valve housing 32 in a common horizontal plane, a plurality of radiating coolant passages 58. The coolant passages 58 extend from the recess 42 to the exterior of the valve housing 32. In order that coolant feed tubes, such as a coolant feed tube 60 may be communicated with the coolant passages 58, the coolant passages 58 are provided with large counterbored outer end portions 62 in which the ends of the feed tubes 60 are received. The feed tubes 60 are clamped in place by suitable setscrews 64, as is best illustrated in Figure 3. The opposite ends of the feed tubes 60, which are flexible, are suitably positioned relative to the individual tools carried by the turret 12.

In order that a coolant supplied to the valve member 50 may be selectively directed on one of the various tools carried by the turret 12 as the turret 12 is positioned, there is formed in the valve member 50 a recess 66 which is an extension of the bore through the neck portion 52. Communicating with the lower part of the recess 66 is a horizontal bore 68 which opens through the outer surface of the valve member 50 and which is disposed in the same plane as the coolant passages 58 so as to be selectively alignable therewith as the turret 12 and the coolant valve housing 32 are rotated with the valve member 50 being stationary.

In order that the amount of coolant supplied to the various tools carried by the turret 12 may be selectively varied to each of the tools, there is formed in the valve housing 32 a plurality of vertically extending recesses 70. The recesses 70 have vertical axes which intersect the horizontal axes of the coolant passages 68 and are of larger diameters than the coolant passages 68, as is best illustrated in Figure 4. The recesses 70 extend through the top of the valve housing 32 and are partially closed by the cover plate 44.

Disposed in each of the recesses 70 is a generally cylindrical valve element 72 which is mounted for rotation. The individual valve element 72 is provided with a reduced upper portion 74 which extends through a small diameter bore 76 in the cover plate 44 in alignment with its recess 70. The extreme upper end of the upper portion 74 is provided with a tool engageable formation 78 to facilitate the rotation of the individual valve element 72.

As is best illustrated in Figure 4, each of the valve elements 72 is provided with a transverse bore 80. The transverse bores 80 are disposed in the same plane as the coolant passages 58 and are alignable therewith to any degree desired whereby the amount of coolant passing through an individual coolant passage 58 may be varied as desired. Thus as the valve housing 32 is rotated, the amount of coolant which will be supplied will be varied as needed by the individual tools carried by the turret 12. In order that the valve element 72 may be retained in adjusted positions, they are spring-urged upwardly against the underside of the cover plate 44 by spring members 82, as is best illustrated in Figure 3.

In order that the interior of tools, such as the tool 26, may be supplied with a coolant, there is also provided a plurality of circumferentially arranged vertical coolant passages 84 which open through the bottom of the recess 42. The coolant passages 84 have internally threaded lower portions 86 in which are selectively received fittings 88 of coolant supply tubes 90. The other ends of the coolant supply tubes 90 are provided with fittings 92 which are removably threaded into the associated tools, such as the tool 26.

In order that coolant may be selectively supplied to the coolant passages 84, there is formed in the valve member 42 a vertical bore 94. The vertical bore 94 communicates with the horizontal bore 68 so that coolant may be simultaneously supplied to both a coolant passage 68 and a coolant passage 84, the coolant passages 68 and 84 being arranged in pairs circumferentially spaced about the valve housing 32.

In the event no coolant is to be supplied through any one of the coolant passages 68, there may be placed in the counterbore 62 thereof a solid plug, such as the plug 96. Such a plug 96 is not absolutely necessary inasmuch as the valve element 72 for such coolant passage 58 may be turned to a shut-off position, as is best illustrated in Figure 4. However, the plug 96 assures against leakage.

The unused ones of the coolant passages 84 are also closed by plugs 98. The plugs 98 are threadedly engaged in the internally threaded outer end portions 86 of the desired coolant passages 84 to insure a proper seal.

From the foregoing description of the present invention, it will be readily apparent that as the turret 12 is rotated to bring to bear one of the tools carried thereby with respect to the workpiece, the coolant supply to that tool will be immediately started and that such coolant supply will be the desired quantity inasmuch as the quantity has been preset by properly setting the coolant valve 30. As the turret 12 is rotated from one position to another, the entire coolant is temporarily shut off while the tool is brought close to its desired operating position, at which time the supply of coolant will automatically start. If desired, a master coolant supply shut-off valve (not shown) may be provided for the coolant supply line 56.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A rotary coolant valve comprising a valve housing, means for mounting said valve housing on top of a machine tool turret, a rotary valve member mounting in said valve housing, a first set of coolant passages in said valve housing and extending from said valve member to the exterior of said valve housing, means connected to said valve housing and communicating with said first set of coolant passages for supplying coolant to exteriors of tools, a second set of coolant passages in said valve housing and extending from said valve member to the exterior of said valve housing, other means connected to said valve housing and communicated with said second set of coolant passages for supplying coolant to interiors of tools, said coolant passages being aligned in pairs, each pair including one of said first set and one of said second set, said valve member being hollow and having coolant outlets alignable with one of said pairs of coolant passages as said valve housing is selectively circumferentially positioned relative to said valve member, flow control valves carried by said valve housing and traversing certain of said coolant passages, said flow control valves being in the form of valve elements mounted for rotation, said valve elements having transverse bores selectively alignable with said certain coolant passages to control the flow of coolant therethrough.

2. A rotary coolant valve comprising a valve housing, means for mounting said valve housing on top of a machine tool turret, a rotary valve member mounting in said valve housing, a first set of coolant passages in said valve housing and extending from said valve member to the exterior of said valve housing, means connected to said valve housing and communicating with said first set of coolant passages for supplying coolant to exteriors of tools, a second set of coolant passages in said valve housing and extending from said valve member to the exterior of said valve housing, other means connected to said valve housing and communicated with said second set of coolant passages for supplying coolant to interiors of tools, said coolant passages being aligned in pairs, each pair including one of said first set and one of said second set, said valve member being hollow and having coolant outlets alignable with one of said pairs of coolant passages as said valve housing is selectively circumferentially positioned relative to said valve member, flow control valves carried by said valve housing and traversing certain of said coolant passages, said flow control valves being in the form of valve elements mounted for rotation, said valve elements having transverse bores selectively alignable with said certain coolant passages to control the flow of coolant therethrough, a part of each valve element projecting above said valve housing to facilitate positioning of said valve elements.

References Cited in the file of this patent

UNITED STATES PATENTS

| | | |
|---|---|---|
| 433,614 | Batter | Aug. 5, 1890 |
| 772,195 | Vogel | Oct. 11, 1904 |
| 1,185,532 | Pfouts | May 30, 1916 |
| 1,937,324 | Pick | Nov. 28, 1933 |
| 1,937,330 | Brice | Nov. 28, 1933 |
| 2,042,186 | Peterson | May 26, 1936 |
| 2,076,697 | Brauner | Apr. 13, 1937 |
| 2,188,391 | Haynes | Jan. 30, 1940 |
| 2,461,631 | Darash | Feb. 15, 1949 |